Sept. 9, 1924.  1,508,108
L. LOMBARDI
SOLDERING OR WELDING TOOL
Filed April 21, 1923
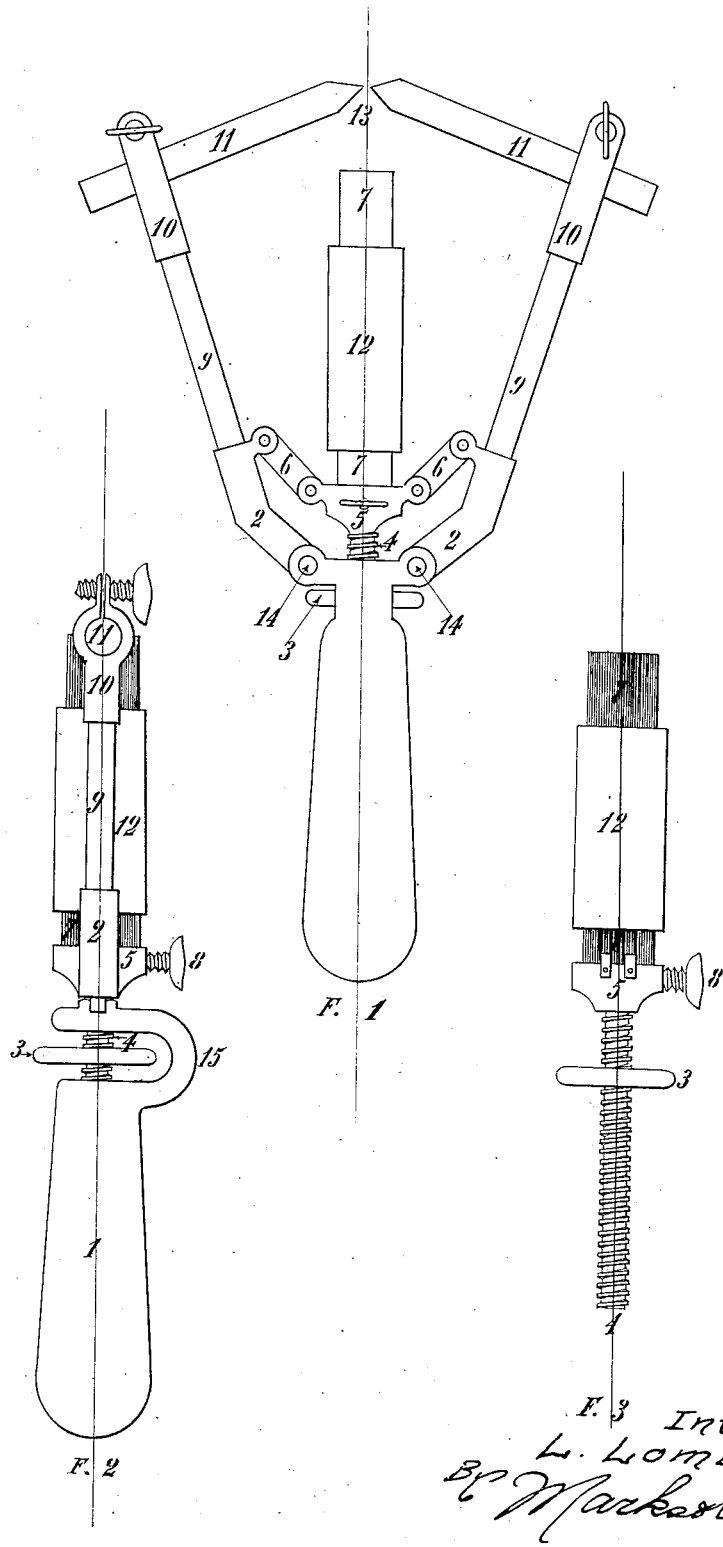
Inventor
L. Lombardi Patented Sept. 9, 1924.

1,508,108

UNITED STATES PATENT OFFICE.

LAMBERTO LOMBARDI, OF ROME, ITALY.

SOLDERING OR WELDING TOOL.

Application filed April 21, 1923. Serial No. 633,813.

*To all whom it may concern:*

Be it known that I, LAMBERTO LOMBARDI, subject of the King of Italy, residing at Rome, Italy, have invented certain new and useful Improvements in Soldering or Welding Tools, of which the following is a specification.

The present invention has for object a tool for soldering or welding metals in which the heat or flame is given by an electric arc produced by the same tool and deflected by a magnetic field developed also in the same tool, which field blows the arc against the pieces of metal to solder or weld.

The tool is represented in the accompanying drawing, in which:

Fig. 1 is a front view of the tool of which
Fig. 2 is a side view, and
Fig. 3 a view of the tool deprived of the electrodes supporting arms.

To a metallic handle 1 are pivotally fixed at 14 two arms 2, which, by means of the connecting rods 6 are pivotally connected to a cross head 5 having a screw rod 4 that enters into the central hole of the handle 1 and is screwed into a die 3 as it is better seen in Fig. 2 that shows how the handle is shaped in its upper end in order to support the device.

The cross head 5 supports an iron core 7 which is fixed to it by means of a screw 8. Around the said core is wound the coil 12.

To the top of the arms 2 are mounted the small tubes 9 of insulating material, and on the ends of the latter are adapted the clamps 10 that support the electrodes 11.

The electric current is brought to the tool through a cord having two wires, one of which is fixed directly to one of the clamps and through this the current passes to one of the electrodes 11, whilst the other wire is connected to the coil 12 that surrounds the core 7 and from this the current passes on to the other clamp and to the other electrode.

By this arrangement the current when passing causes a voltaic arc to be produced between the points 13 of the electrodes, at the same time that the coil 12 being excited, will magnetize the core and produce a magnetic field which will deflect the arc outward sending it to hit with force against the metallic members to solder or weld.

As it may be seen in Fig. 1, the distance between the points of the electrodes may be adjusted by means of the movement of the die 3, which, adjusting at the same time the position of the magnet 7 permits to so regulate the distance and relative positions of the electric device as to supply the strongest arc and the most convenient action of the magnetic field on said arc.

Having now described the tool that forms the object of this invention and how it operates in order to perform the heating of the parts to solder, I now declare that what I claim is:

1. A tool for welding or soldering comprising a handle adapted to be gripped by the operator, arms pivotally connected to the handle and provided at their ends with clamps, electrodes secured in said clamps and having their points arranged in close proximity to each other, an electro-magnet arranged between said arms and movable axially toward and away from the points of the electrodes, and a single means for simultaneously adjusting the points of the electrodes toward and away from each other and for moving the electro-magnet toward and away from said points.

2. A hand tool for soldering or welding comprising a handle adapted to be gripped by the operator, arms pivotally connected to said handle and provided at their outer ends with clamps, electrodes secured in said clamps, arranged at angles to each other and having their points in close proximity to one another, an axially movable member connected to the handle, links connecting said member to the arms, an electro-magnet carried by said member and movable toward and away from the points of the electrodes, and means for moving the axially movable member.

3. A soldering or welding tool comprising a handle, an axially movable member arranged partly within and partly outside of said handle, an electro-magnet carried by the axially movable member and movable with said member in a straight line, arms pivotally connected to the handle and arranged on opposite sides of the electro-magnet, links pivotally connecting said arms to the axially movable member, clamps arranged at the outer ends of said arms, electrodes secured in the clamps, arranged at angles to each other and having their points arranged in close proximity to each other, and means for actuating the axially movable member, whereby said electro-magnet is moved in a straight line and the points of the electrodes are moved toward or away from said line.

In testimony whereof I affix my signature in presence of two witnesses.

LAMBERTO LOMBARDI.

Witnesses:
   A. M. MATTARI,
   FRANCESCO TORINGOCINE.